Nov. 24, 1942.    C. G. OLSON    2,303,224
METHOD AND MEANS FOR ASSEMBLING SCREWS AND LOCK WASHERS
Filed Aug. 27, 1938    3 Sheets-Sheet 1
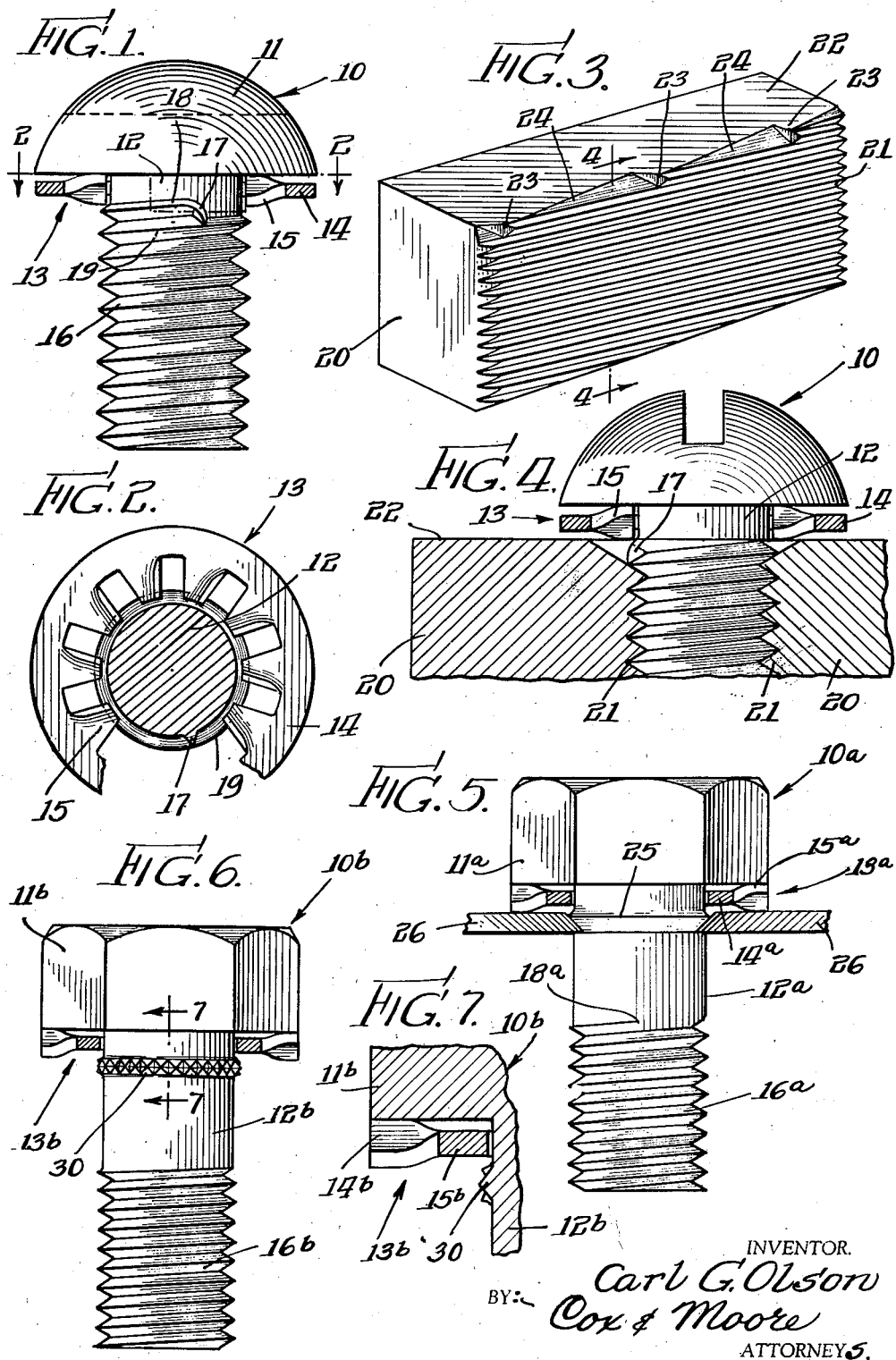
INVENTOR.
Carl G. Olson
BY: Cox & Moore
ATTORNEYS.

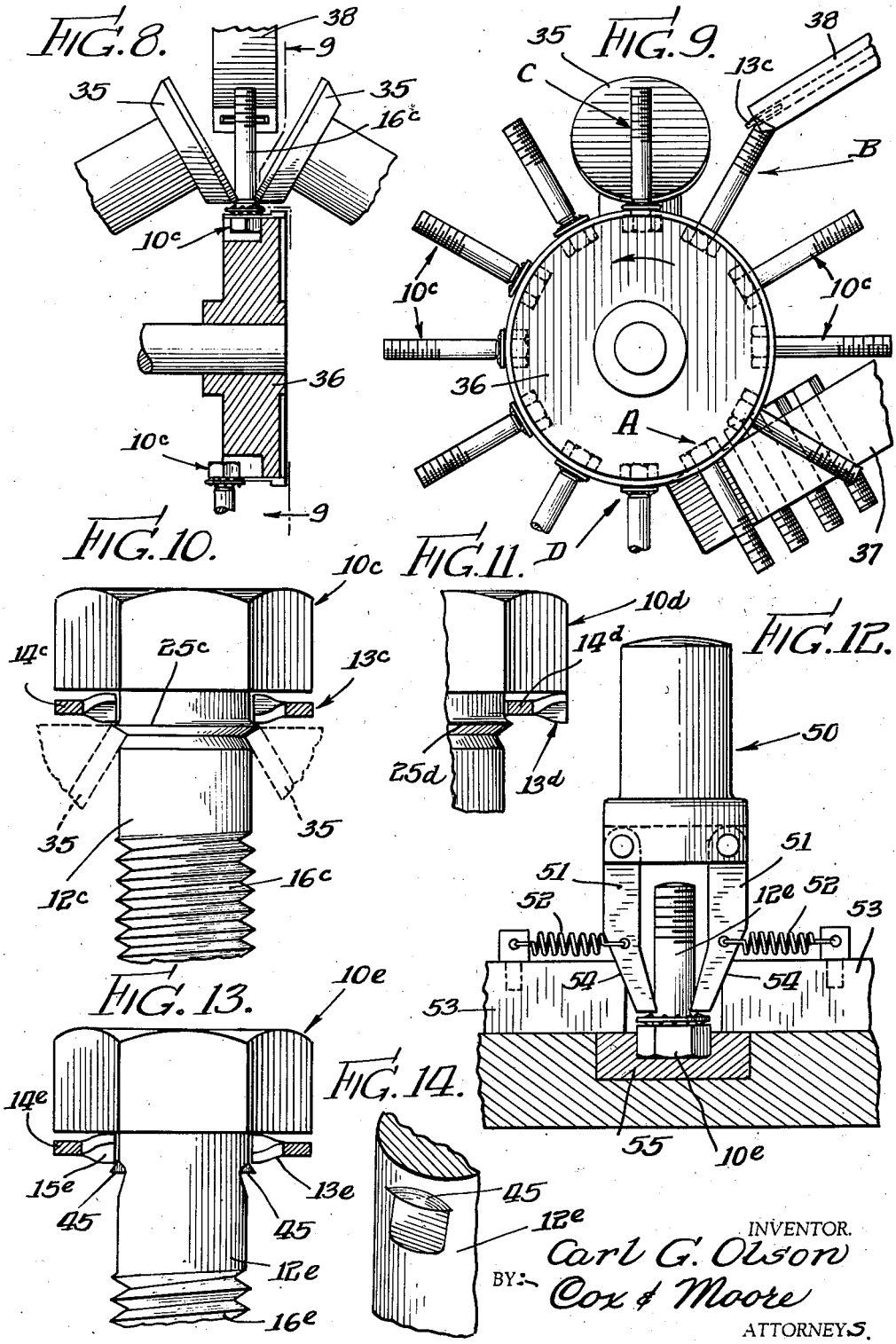

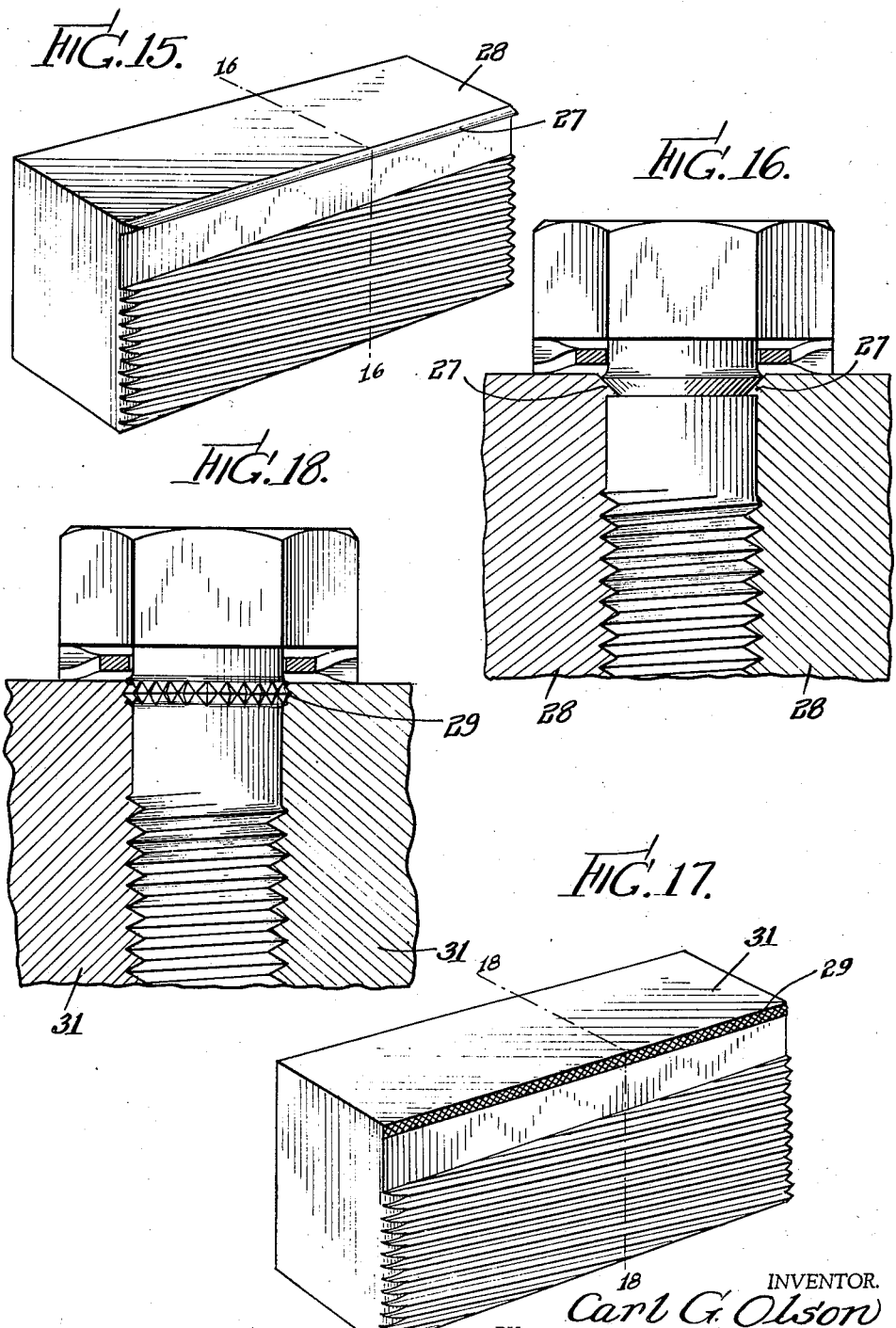

Patented Nov. 24, 1942

2,303,224

UNITED STATES PATENT OFFICE 2,303,224

METHOD AND MEANS FOR ASSEMBLING SCREWS AND LOCK WASHERS

Carl G. Olson, Chicago, Ill., assignor to Illinois Tool Works, Chicago, Ill., a corporation of Illinois Application August 27, 1938, Serial No. 227,045

16 Claims. (Cl. 10—10)

This invention relates to screw and lock washer assemblies, and to methods for producing such assemblies. It relates more particularly to assemblies of the type wherein the lock washer is adapted to be permanently associated with the screw prior to the application of the screw to a work piece.

One of the objects of the invention is to provide in a screw and lock washer assembly of the type wherein the washer is held in permanent association with the screw by the screw thread, a thread portion which is deformed or diverted from its normal helical position whereby to insure retention of the lock washer in assembled position upon the screw. More specifically the invention contemplates the formation of such deformed or diverted thread portion at the time the thread is formed and as an incident to the formation process.

Another object of the invention is to provide in a screw and lock washer assembly means other than the screw thread provided on the screw for retaining the washer in assembled position, whereby the retention means will be independent of the positioning or character of the screw thread, such means being formed, preferably extruded, on the screw after the washer has been placed in assembled position thereon.

A further object of the invention is to provide a screw and lock washer assembly having annularly disposed means on the screw, either spaced or continuous, for holding the washer in assembled position thereon, such means being preferably extruded on the shank of the screw after the washer has been arranged in assembled position.

A still further object of the invention is to provide improved means and methods for producing screw and lock washer assemblies wherein the lock washer is effectively held in permanent association with the screw while leaving the locking portions thereof free to engage the work piece.

Still other objects and advantages of the invention will appear from the following description when taken in connection with the accompanying drawings wherein certain preferred embodiments of the invention are illustrated.

In the drawings, wherein like reference numerals refer to like parts throughout:

Fig. 1 is a general assembly view, partly in section, of a screw and lock washer assembly constructed in accordance with one form of the invention.

Fig. 2 is a transverse section of the construction shown in Fig. 1, on the line 2—2 thereof.

Fig. 3 is a detail perspective view of one of the die blocks which may be used for rolling the thread of the screw shown in Fig. 1.

Fig. 4 is a sectional view illustrating the thread rolling, the left-hand die block being shown on the line 4—4 of Fig. 3.

Fig. 5 is an assembly view, similar to Fig. 1, but showing a washer retainer means as formed in accordance with another embodiment of the invention.

Figs. 6 and 7 illustrate a third form of washer retaining means, Fig. 7 being a detail sectional view taken on the line 7—7 of Fig. 6.

Fig. 8 is a view illustrating mechanism for producing washer retainer means on the screw shank, in accordance with another form of the invention.

Fig. 9 is a side sectional view of the mechanism illustrated in Fig. 8, taken on the line 9—9 thereof.

Fig. 10 is an assembly view on an enlarged scale showing a screw and lock washer assembly as produced by the mechanism illustrated in Figs. 8 and 9.

Fig. 11 is a partial view of an assembly similar to Fig. 10, but employing a lock washer having outwardly extending locking teeth.

Fig. 12 illustrates still another method for producing washer locking projections upon the screw shank.

Fig. 13 is a view on an enlarged scale showing an assembly as produced by the mechanism of Fig. 12.

Fig. 14 is a partial perspective view on a still further enlarged scale of one of the washer retaining projections of the construction shown in Fig. 13.

Figure 15 is a detailed perspective view of one of the die blocks which may be used for rolling the thread and washer retaining rib of the screw shown in Figure 5.

Figure 16 is a sectional view illustrating the rolling of the thread and the washer retaining rib, the left hand die block being shown on the line 16—16 of Figure 15.

Figure 17 is a view in perspective of a die block used in forming the fastener unit of Figure 6, and Figure 18 is a sectional view illustrating the rolling of the thread and washer rib of the unit shown in Figure 6, the left hand die block being shown on the line 18—18 of Figure 17.

In the patents to E. C. Crowther Nos. 2,113,424 and 2,113,425 dated April 5, 1938, there is disclosed a screw and lock washer assembly wherein the lock washer is held upon the shank of the screw by means of the screw thread, the thread being rolled on the screw after the washer has been placed in position thereon. During the thread rolling operation the metal of the thread is upset or displaced so that the outer diameter of the thread is greater than the normal diameter of the screw shank prior to the thread rolling operation. The washer, which has its internal diameter only slightly greater than this normal diameter, is accordingly held in permanent association with the screw, forming a screw and lock washer assembly which may be effectively applied as a unit to a work piece. In devices of the type shown in the patents, the thickness of the lock washer body, or in the case of lock washers of the internally extending twisted tooth type the additional effective thickness of the washer imparted by the twisting of the teeth, is relied upon to prevent the washer from unthreading itself from the screw by working its way along the length of the threads in the manner of a nut. In accordance with the present invention the thread of the screw, preferably adjacent the upper end thereof, is deformed or diverted whereby to present a barrier to any unauthorized unthreading of the washer along the screw shank and thereby more effectively securing the washer in proper permanent association upon the screw.

In Figs. 1 and 2 of the drawings one satisfactory means is illustrated for providing such a barrier. In this instance the screw 10 comprising a head 11 and a threaded shank 12 has associated therewith a lock washer 13, providing a screw and lock washer assembly. As illustrated, the lock washer is of the internal twisted tooth type comprising an annular body portion 14 and a series of radially inwardly directed twisted teeth 15. The lock washer is held in permanent association upon the screw shank, due to the fact that the internal diameter of the washer is only slightly in excess of the normal diameter of the shank, and less than the outer diameter of the screw thread 16 formed thereon. The thread is preferably formed by a rolling operation, and during the rolling the metal of the shank is upset or displaced in forming the thread so that the outer diameter of the thread is greater than the normal or original diameter of the shank. In accordance with the invention the upper end of the thread 16 is provided with a distorted or deflected portion 17 which may be termed a burr, and which forms an effective barrier against movement of the lock washer into the trough of the thread. The washer is thus effectively retained on the upper portion of the screw shank, and is prevented from working into the trough of the thread or from threading itself downwardly along the thread of the shank. It is to be noted that the deflected portion 17 which is formed at the end of the uppermost thread 18 is curved downwardly into proximity with the adjacent thread 19, thereby closing the entrance to the thread trough and forming an effective barrier at the termination of the trough.

While the invention has been shown in Figs. 1 and 2 in association with a lock washer of the internally extending twisted tooth type, it is to be understood that it may be used as well with lock washers of various kinds, including washers of the external twisted tooth type such, for example, as shown in Fig. 5. The use of the distorted or deflected thread portion permits the use of lock washers of very thin stock without any danger that the washer will unthread itself or become otherwise dislodged from its proper position at the upper portion of the screw shank. Likewise the distorted or deflected thread portion permits greater manufacturing tolerances in the making of the parts. For example, even though the internal diameter of the lock washer should be only slightly less than the exterior diameter of the thread, the deflected thread portion would prevent the unthreading of the washer. Where the pitch of the thread is very fine, the rolled thread will have an external diameter only slightly greater than the original or normal diameter of the screw shank. The distorted thread is particularly advantageous for use in such instances to prevent unauthorized dislodging of the washer.

While the retention burr on the thread may be formed in various ways, preferably it is formed at the time the thread is rolled, and by means of the same die which rolls the thread. A suitable die for effecting this operation is illustrated in Fig. 3. This die comprises a block 20 provided with threads 21 for rolling the thread on the shank of the screw. It is to be understood that in rolling the thread, the screw shank is rolled between a pair of similar cooperating die blocks, as shown in Fig. 4, with the assembled lock washer arranged between the upper face 22 of the blocks and the underside of the screw head. The upper ends of the die threads, instead of fading out gradually in the usual manner, terminate abruptly as indicated at 23, the adjacent die portions 24 being relieved or cut away as shown. As a result, when the die is utilized to form the thread on the screw shank, the upper end of the thread will be terminated abruptly, and a metal burr 17 will be raised at the termination of the trough of the thread forming a continuation of the crest of the uppermost thread and extending downwardly to substantially close the entrance to the trough, as shown in Fig. 1.

In Fig. 5 an alternate means is illustrated for retaining the lock washer in association with the screw. In this instance an annular rib 25 is formed on the screw shank 12a, the lock washer 13a being arranged on the shank between the rib and the underside of the screw head. Various means may be employed for forming the rib, but in accordance with the invention it is preferably extruded thereon. As illustrated, one suitable means for extruding the rib comprises a pair of rolling disks 26 which may be brought into engagement with the screw shank to roll or extrude the rib thereon after the lock washer has been placed in assembled position. The disks are so shaped that the rib is thrown upwardly and formed immediately adjacent the lock washer.

The lock washer is illustrated as being of the external tooth type comprising an annular rim 14a and externally extending twisted teeth 15a, but it is to be understood that any suitable form of lock washer may be employed. The inner diameter of the lock washer is slightly less than the diameter of the rib 25, and the rib accordingly forms an effective barrier, holding the lock washer in permanent association with the screw and against any inadvertent separation therefrom. Being of annular shape, it is impossible for the lock washer to be moved over the rib so long as the inner diameter of the washer is any appreciable amount less than the diameter of the rib. By placing the washer upon the screw shank prior to the formation of the rib 25, the parts are automatically, permanently assembled as the rib is formed. In this form of construction the rib 25 is independent of the screw thread 16a. The rib acts as an independent retention means. Accordingly the upper end 18a of the screw thread may be spaced at some distance from the screw head, as shown, or the external diameter of the screw thread may be no greater or less than the normal or original diameter of the screw shank, and still the washer will be held in proper assembled position. In some types of screws it is desirable to terminate the upper end of the thread at a considerable distance from the underside of the screw head, and it is frequently also desirable to so form the thread that its exterior diameter will be no greater than the normal diameter of the screw shank. The use of an independent annular retaining rib formed on the screw shank at the upper end thereof immediately below the washer forms an effective means for holding the washer in proper assembled position in such types of screw constructions. While the rib 25 has been illustrated in Fig. 5 as being formed by independent rolling disks 26, it is obvious that the rib can be extruded on the screw shank simultaneously with the rolling of the thread 16a thereon, by providing suitable horizontally extending ribs 27 (Figures 15 and 16) on the thread rolling dies 28.

In Figs. 6 and 7 an embodiment of the invention is illustrated generally similar to that just described, but wherein the annular washer retaining means is in the form of a knurled rib 30 formed on the upper end of the screw shank after the washer has been placed in assembled position thereon. The knurled rib may be formed by independent knurling dies, or by knurling ribs 29 (Figures 17 and 18) arranged at the upper edges of the thread rolling dies 31, as may be desired. The outer diameter of the knurled rib is greater than the inner diameter of the washer, as shown more particularly in Fig. 7, and being annular in form, the rib forms an effective barrier against any unauthorized movement of the washer. The washer 13b is illustrated as being of the external twisted tooth type, but obviously any suitable form of washer may be employed.

In Fig. 10 an embodiment of the invention is illustrated which is similar to that shown in Fig. 5, except that the annular washer retaining rib 25c is of slightly different cross sectional shape, being extruded by mechanism as illustrated in Figs. 8 and 9. The construction illustrated in Fig. 11 is the same as that shown in Fig. 10 except that the washer is of the external twisted tooth type whereas in Fig. 10 it is illustrated as being of the internal twisted tooth type.

Referring to Figs. 8 and 9, the means for extruding or rolling the rib 25c comprises a pair of rollers 35 adapted to engage the screw shank while the screw is held in a rotatable carrier wheel 36. The head of the screw may be rotatably mounted in the carrier wheel, and the rollers 35 operated in different directions so that as the rollers engage the screw, the latter will be rotated on its own axis during the formation of the rib. The carrier wheel may remain stationary during the extrusion of the rib on the screw, or it may be moved slowly forward in the direction of the arrow, Fig. 9, in which event the rollers 35 will preferably be operated at slightly different surface speeds to accommodate for such movement. The screws are placed in the carrier wheel at a suitable feeding station A, being supplied thereto from a trough 37. As the carrier wheel is rotated in the direction of the arrow, the screws are brought successively to station B where the washers 13c are applied thereto from a feed trough 38. The screws, with the washers applied in assembled position, are then carried to a rib forming station C where the rollers 35 form the ribs 25c thereon in the manner previously described. After the formation of the retention rib, the screw and lock washer assemblies are moved to an ejecting station D where they are removed from the carrier wheel. In Fig. 10 the rib forming rollers 35 are diagrammatically shown to illustrate the manner in which they engage the screw shank to displace the metal thereof and form the rib 25c.

In Figs. 13 and 14 a still further embodiment of the invention is illustrated, the mechanism by which the retention means in this form of construction is produced being illustrated in Fig. 12. In this form of construction the lock washer 13e is held in position upon the screw shank by a series of circumferentially spaced lugs or detents 45 struck or extruded from the shank of the screw. Being circumferentially spaced, the detents form an effective annular barrier which will retain any suitable form of lock washer in proper assembled position. Where lock washers of the internal toothed type are employed, the detents will be of sufficient width and size to prevent their slipping between the twisted teeth.

A suitable mechanism for forming the detents, as shown in Fig. 12, comprises a tool 50 movable axially of the screw shank, and provided with a plurality of pivoted shank engaging jaws 51. The jaws are urged outwardly by springs 52 into engagement with a plurality of stationary blocks 53, one block being provided for each of the jaws. The blocks are provided with angular faces as indicated at 54 against which the outer sides of the jaws are adapted to engage. In the operation of the mechanism the screw with the lock washer assembled thereon is first placed within the stationary holding die 55. The tool 50 is then moved downwardly axially of the screw shank. As the tool moves downwardly, the pivoted jaws 51 engage the surfaces 54 of the stationary blocks 53 causing the jaws to be forced inwardly against the action of the springs into engagement with the screw shank. The jaws are forced inwardly and downwardly, and the cutting ends thereof cut or dig into the screw shank extruding the lugs or detents thereon. By increasing the width of the jaws, and by forming the cutting surfaces thereof to conform with the curvature of the screw shank, detents or lugs of any desired increased circumferential extent or width may be obtained.

Claims to the fastener units as articles of manufacture are contained in my copending applications, Serial No. 355,743, filed September 7, 1940; Serial No. 355,744, filed September 7, 1940; Serial No. 355,745, filed Sepember 7, 1940; and claims to the described method of making fastener units, such as shown in Figures 13 and 14, are contained in my copending application, Serial No. 238,418, filed November 2, 1938.

In the various embodiments of the invention illustrated, lock washers of the twisted tooth, either external or internal, line bite type have been shown, as such washers are particularly desirable for use in the constructions. However, as previously stated, it is to be understood that lock washers of various types and kinds may be employed.

It is obvious that various changes may be made in the specific embodiments of the invention set forth for purposes of illustration without departing from the spirit thereof. Accordingly the invention is not to be limited to the specific embodiments shown or described, but only as indicated in the following claims.

The invention is hereby claimed as follows:

1. The method of forming a screw and washer assembly which comprises arranging a washer upon the shank of a screw adjacent the head thereof, forming a thread on the screw shank so that the outer diameter of the thread is greater than the inner diameter of the washer, and forming a burr on the thread adjacent the washer whereby the washer is held in permanent association upon the screw.

2. The method of forming a screw and washer assembly which comprises arranging a washer upon the shank of a screw adjacent the head thereof, forming a thread on the screw shank so that the outer diameter of the thread is greater than the inner diameter of the washer, and distorting a portion of the thread adjacent the washer from its normal helical position whereby to lock the washer in permanent association with the screw.

3. The method of forming a screw and washer assembly which comprises arranging a washer upon the shank of a screw adjacent the head thereof, forming a thread on the screw shank so that the outer diameter of the thread is greater than the inner diameter of the washer, and simultaneously deflecting a portion of the thread from its normal helical positioning whereby to retain the washer in permanent association upon the screw shank.

4. The method of forming a screw and washer assembly which comprises arranging a washer on the shank of a screw adjacent the head thereof, rolling a thread upon the screw shank so that the outer diameter of the thread is greater than the inner diameter of the washer, and simultaneously forming a portion of the thread displaced from its normal helical position whereby to lock the washer in permanent association with the screw shank.

5. The method of forming a screw and washer assembly comprising arranging a washer upon the shank of a screw element adjacent the head thereof, extruding a thread on the screw shank, and contemporaneously forming means on the shank other than a thread convolution for holding the washer in position.

6. The method of forming a screw element to hold a washer element upon the shank of the screw element adjacent the head thereof, which comprises extruding a thread on the screw shank, and contemporaneously extruding an element on the screw shank other than a thread convolution to hold the washer in position.

7. The method of making a screw and washer assembly which comprises arranging a washer upon the shank of a screw adjacent the head thereof, forming a thread on the screw shank, and simultaneously forming additional washer retaining means on the shank, said thread and last named means being formed on the shank after the washer is arranged in assembled position thereon.

8. The method of making a screw and washer assembly which comprises arranging a washer upon the shank of a screw adjacent the head thereof, rolling a thread on the screw shank, and simultaneously rolling an annular washer retaining rib on the shank, said rolling operations being carried out after the washer has been arranged in assembled position upon the screw shank.

9. The method of forming a screw and washer assembly which comprises arranging a washer loosely upon the shank of a screw adjacent the head thereof, thereafter engaging the shank adjacent the free side of the washer only with a pair of rib forming rollers, while simultaneously rotating the screw upon the axis of its shank whereby to form a washer retaining annular rib on the shank for holding the washer in permanent association thereon as against substantial axial movement.

10. The method of forming a screw element to hold a washer element upon the shank of the screw element adjacent the head thereof, which comprises forming a thread on the screw shank, and contemporaneously extruding annularly disposed means on the shank other than a thread convolution for holding the washer in position.

11. The method of forming a screw and washer assembly which consists in arranging a washer upon the shank of a screw element adjacent the head thereof, forming a thread on the shank of the screw element so that the outer diameter is greater than the inner diameter of the washer and forming an element in association with the thread convolution adjacent the washer, said element extending transversely with respect to said thread convolution so as to prevent inadvertent separation of the screw and washer due to relative rotation thereof.

12. The method of forming a screw and washer assembly which consists in arranging a washer upon the shank of a screw element adjacent the head thereof, forming a thread on the shank of the screw element so that the outer diameter is greater than the inner diameter of the washer and forming an element in association with the thread convolution adjacent the washer, said element obstructing the space between the thread convolution adjacent the washer and the next adjacent thread convolution to prevent inadvertent separation of the screw and washer due to relative rotation thereof.

13. In a device for assembling screw and washer elements, mechanism for telescoping screw elements with washer elements, means for supplying screw elements to said telescoping mechanism, means for supplying washer elements to said telescoping mechanism, and means operatively associated with the telescoping mechanism for forming on each screw element beneath the telescoped washer a washer retaining rib at an angle to the thread convolution.

14. In a device for assembling screw and washer elements, mechanism for telescoping screw elements with washer elements, means for supplying screw elements to said telescoping mechanism, means for supplying washer elements to said telescoping mechanism, and means operatively associated with the telescoping mechanism for forming on the screw element beneath the washer a washer retaining rib distinct from the thread.

15. In a mechanism for assembling screw elements with washer elements, a holder for elements of one kind, means for feeding an element of said one kind into said holder, means for feeding an element of the other kind to a predetermined position into juxtaposition to said holder, means for shifting said elements relatively into telescopic relation while the elements of said one kind is held in said holder, and means in juxtaposition to said holder for forming on the shank of the screw element, while the element of said one kind is held in said holder, a washer retaining rib beneath the washer element.

16. In a machine for making a screw and lock washer unit including a screw element having a thread portion spaced from the head by a plain shank portion of a length greater than the thickness of the washer, the combination of means for positioning a lock washer upon said shank portion of the screw adjacent the head thereof and spaced from the thread portion of the shank, means for maintaining the screw against axial movement out of the washer, and upsetting members engaging the shank portion between the thread portion of the shank and the head proximate the free side of the washer and at circumferentially spaced points while the screw element is maintained against axial movement by said maintaining means, said upsetting members being constructed to form a washer retainer holding the washer against axial movement along the plain shank portion to the thread portion of the shank.

CARL G. OLSON.